Aug. 10, 1965 K. A. L. NÖJD 3,199,128
FLOAT JACKET AND ASSOCIATED ELEMENTS
Filed Sept. 4, 1963 6 Sheets-Sheet 1
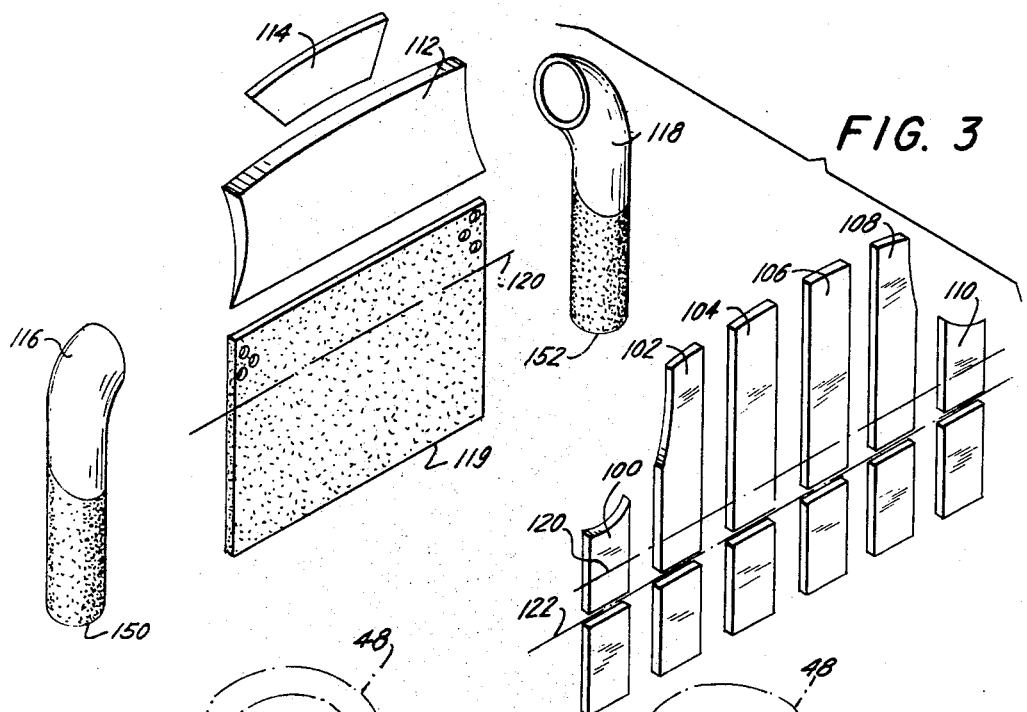
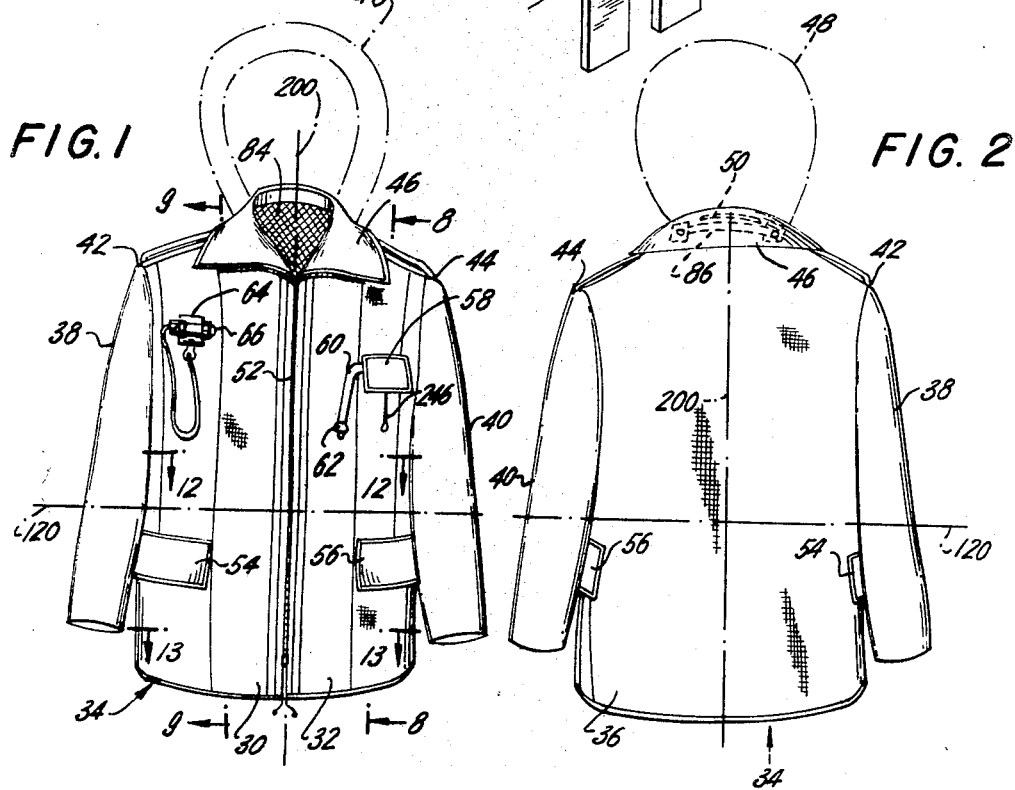

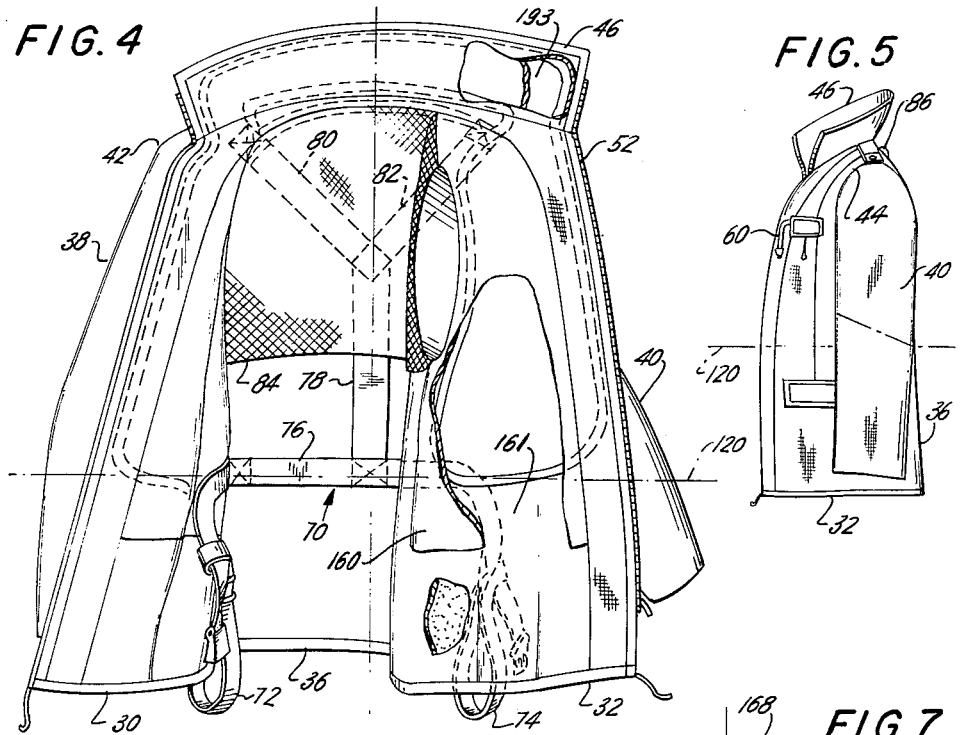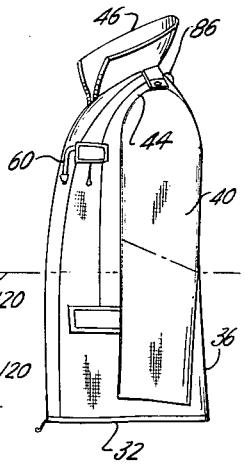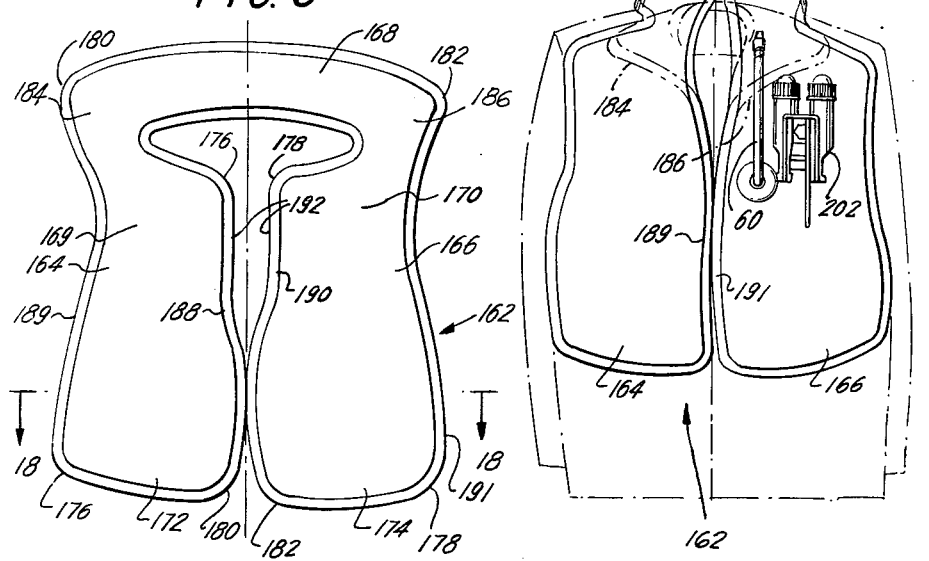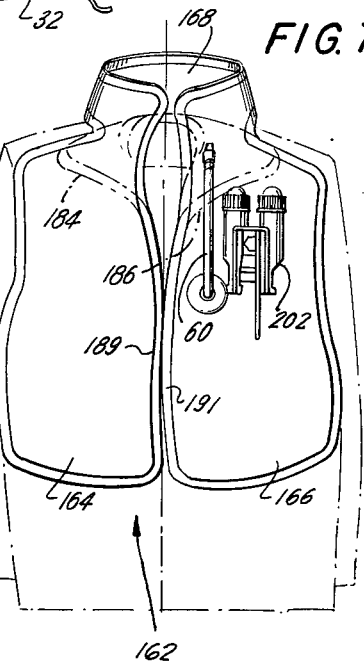

FIG. 8
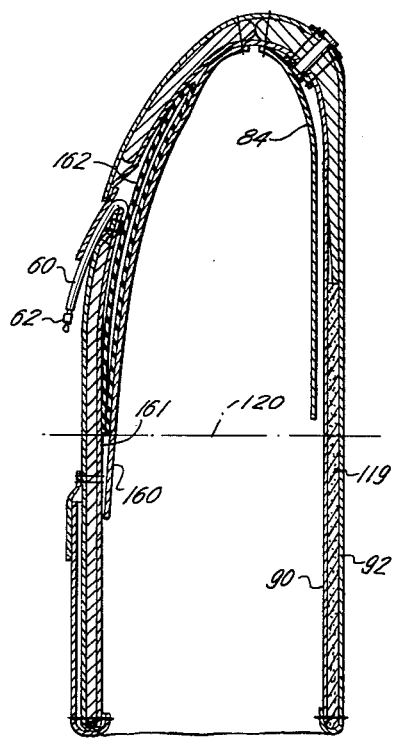
FIG. 9
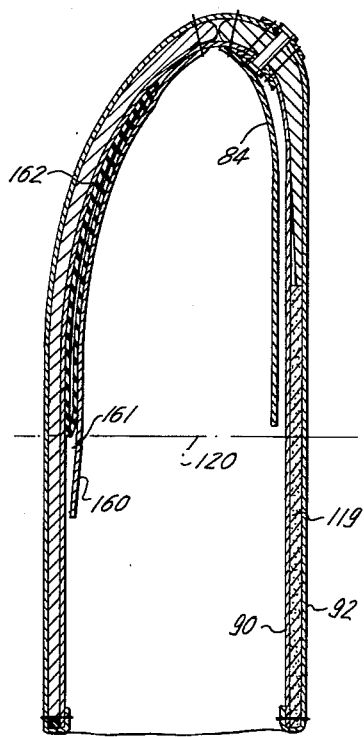
FIG. 10
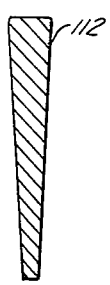
FIG. 11

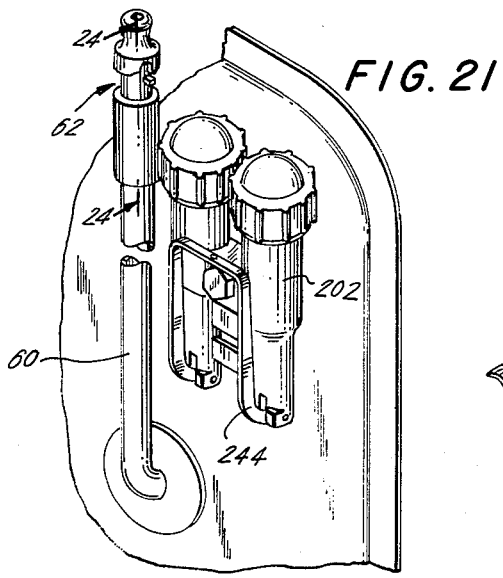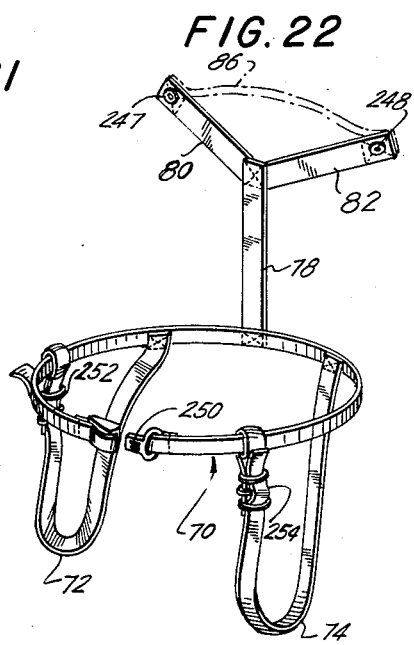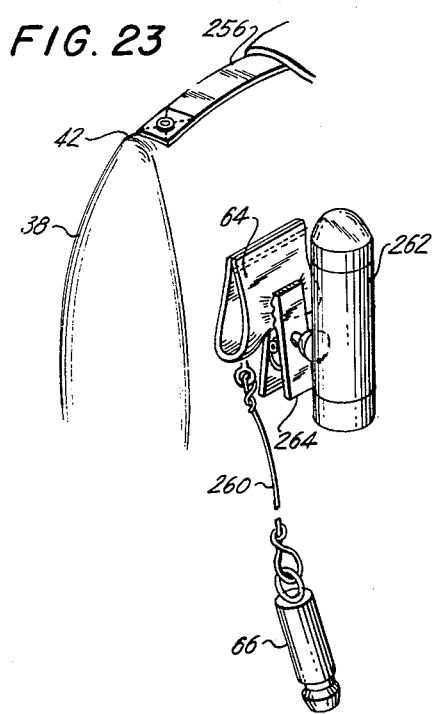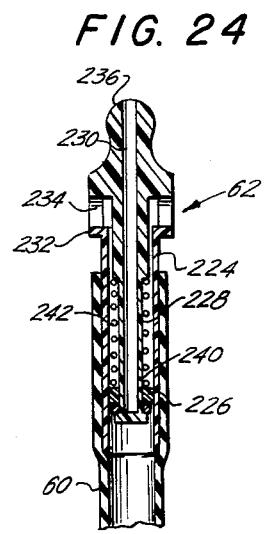

United States Patent Office 3,199,128
Patented Aug. 10, 1965

3,199,128
FLOAT JACKET AND ASSOCIATED ELEMENTS
Knut Axel Leonard Nöjd, Ekbacka, Nitta, Sweden
Filed Sept. 4, 1963, Ser. No. 306,531
Claims priority, application Sweden, Sept. 11, 1962, 9,814/62
46 Claims. (Cl. 9—316)

This invention relates to jackets of the type provided with buoyant means adapted to keep the wearer afloat in water.

It is a general object of the invention to provide an improved float jacket which can be economically manufactured and which is adapted for being provided in different styles.

It is a further object of the invention to provide a float jacket having improved safety provisions.

Yet another object of the invention is to provide a special combination of a buoyant material having fixed floatation characteristics with an inflatable device such that an improved type of floatation is realized.

According to one aspect of the invention, a float jacket is provided which defines a longitudinal axis and in which a floatation material is provided which causes the user to be rotated about said axis when immersed in water, thereby bringing the user to a face-up position.

In accordance with still another aspect of the invention, a float jacket is provided having a transverse turning axis relative to which floatation materials are judiciously employed such that the user is brought to a head-up position when immersed in water.

In accordance with one of the many features of the invention, the floatation materials are so arranged that the bottom portion of the float jacket is enabled to pivot or flap upwardly when the wearer is immersed in water so as to provide an improved buoyant effect.

In accordance with another feature of the invention, an inflatable bladder is so combined with a collar affixed to the jacket that upon inflation the bladder causes the collar to stand erect and so hold up the head of the wearer when he is in the water.

A further feature of the invention relates to the provision of arms or sleeves on a float jacket, in such a manner that movement of the user when in the water is facilitated.

Yet a further feature of the invention relates to the manner in which buoyant material is distributed in the body portion of the jacket from the top to the bottom thereof.

According to a further aspect of the invention, there is provided an improved inflatable bladder intended for use with a buoyant material having fixed floatation characteristics. As will be shown hereinafter, said bladder is comprised of lobes which are unbalanced with respect to their buoyant characteristics in order to provide a turning moment the purpose of which will become hereinafter apparent.

In accordance with the last discussed aspect of the invention, buoyant material having fixed floatation characteristics are employed with a floatation imbalance which is opposed to that of the aforesaid lobes.

There will also be disclosed in detail hereinunder the use of a perforated inner liner which prevents air from being trapped within the body portion of the float jacket provided by the invention, to prevent an ensuing immobility of the user when he chances to fall into the water.

A further feature of the invention which will be described in greater detail hereinunder is the specific manner in which a tube is provided for purposes of inflating the aforenoted bladder, said tube being made available through a pocket provided in the float jacket.

Yet another aspect of the invention relates to the provision of multiple inflation means whereby the bladder can be inflated by one means or another, depending upon circumstances.

Yet another feature of the invention relates to the provision of a lamp which is detachably affixed to the float jacket of the invention.

Still another feature of the invention relates to the provision of a whistle and a loop for mounting the same on the float jacket of the invention.

It is yet another object of the invention to provide improved means for facilitating the removal of the wearer of the float jacket of the invention from the water in which he has been immersed.

Still another object of the invention is to provide an improved float jacket having therein a leg harness adapted for maintaining the jacket on the wearer.

In achieving the above and other of its objectives, the invention contemplates the provision of a float jacket comprising a body portion defining a vertical axis of symmetry and having in the said body portion a buoyant material of fixed floatation characteristics asymmetrically distributed in the body portion relative to the axis such that one side of the body portion has a greater buoyancy due to the said buoyant material than the other side.

The invention further contemplates the provision of an inflatable bladder in the said body portion, the bladder being also asymmetrically dimensioned relative to the axis of symmetry to effect a greater buoyancy on one side of the body than on the other in opposition to the inequality of the buoyant material of fixed floatation characteristics.

In achieving still other of the objectives of the invention, there is contemplated the provision of a body portion wherein the buoyant material in the back thereof is confined to the upper half of the same.

To achieve still other of its objectives, the invention contemplates the provision of a float jacket wherein are employed floatation elements so disposed as to define a hinge axis in the lower half of the body portion whereby to permit a flapping action of that part of the front of the body portion below the hinge axis when the jacket is immersed in water.

The above objects and features of the invention, as well as advantages thereof, will become apparent from the following detailed description of a preferred embodiment of the invention as illustrated in the accompanying drawing in which:

FIGURE 1 is a front view of a float jacket provided in accordance with a preferred embodiment of the invention;

FIGURE 2 is a back view of the jacket of FIG. 1, there being shown in both said views a hood which may be optionally employed with jackets of the invention;

FIGURE 3 is an exploded view illustrating insulating and buoyant elements employed in accordance with the preferred embodiment of the invention;

FIGURE 4 is a front view of the float jacket of FIG. 1 in opened condition exposing the interior of said jacket;

FIGURE 5 is a side view of the float jacket of FIG. 1;

FIGURE 6 is a front view of an inflatable bladder employed in the float jacket of the invention, said bladder being shown before it is arranged for insertion into said jacket;

FIGURE 7 shows the bladder of FIG. 6 arranged for insertion into the jacket, the bladder being shown in two conditions, one of which shown in phantom lines is the condition assumed with the bladder deflated and the other of which is the condition assumed with the bladder inflated condition;

FIGURE 8 is a cross-sectional view taken along line 8—8 of FIG. 1;

FIGURE 9 is a cross sectional view taken along line 9—9 of FIG. 1;

FIGURE 10 illustrates, in end view, a particular floatation element employed in accordance with the invention and appearing also in FIG. 3;

FIGURE 11 is a cross-sectional view of the rear upper portion of the float jacket of FIG. 1;

FIGURE 21 illustrates, in perspective view, the inflation apparatus associated with the bladder of the invention;

FIGURE 22 is a perspective view of a harness employed in accordance with the invention;

FIGURE 23 illustrates a shoulder portion of the jacket of the invention and a breast portion upon which are illustrated a lamp and a whistle; and FIGURE 24 is a cross-sectional view, taken along line 24—24 of FIG. 21, of a detail of the inflation tube employed with the bladder of the invention.

Figure 12:
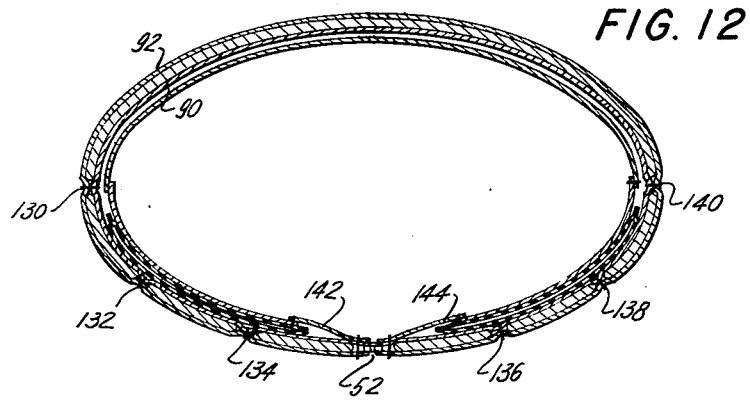
FIGURE 12 is a cross-sectional view taken along line 12—12 of FIG. 1.

In the drawing, FIGS. 1 and 2 respectively illustrate the front portions 30 and 32 of the body portion 34 of the float jacket of the invention, and the back or rear portion 36 thereof.

Said float jacket furthermore comprises a right arm 38 and a left arm 40, these being respectively coupled to said body portion 34 in the vicinity of shoulder zones 42 and 44.

The float jacket of the invention moreover comprises a collar 46 illustrated in FIGS. 1 and 2 as lying flatly against the back portion 36 and extending forwardly to rest flatly against the front portions 30 and 32.

The float jacket of the invention still further may comprise a hood 48 which is optionally provided and which may be connected to the rear portion 36 of the jacket by means of a zipper 50.

The front portions 30 and 32 are each provided with cooperating elements of a zipper 52 which enables said front portions to be fastened together in conventional manner.

Also provided in the front portions 30 and 32 are lateral hip pockets 54 and 56 which may be of conventional nature and construction.

A breast pocket 58 is also provided, which incorporates some of the features of the invention as will be hereinafter indicated in greater detail. Seen extending through the breast pocket 48 is an inflation tube 60, provided with a mouthpiece element 62, the structure and purpose will become hereinafter apparent.

Mounted on the right breast of the front portion 30 is a loop 64 with which is associated a whistle 66 and the details of which will become hereinafter apparent.

The open view of the jacket given in FIG. 4 illustrates the harness 70 (see also FIG. 22) consisting of leg loops 72 and 74 and a waist strap 76, all interconnected to a yoke 78, the upper straps 80 and 82 of which are connected according to a feature of the invention as will be hereinafter shown.

It should also be noted with respect to FIG. 4 that an inner lining 84 is provided which is of a perforate material which may be synthetic or otherwise. This lining performs the conventional function of preventing the packet from adhering to the wearer, but being perforated also provides that, when the user of the float jacket is immersed in water, no air is trapped by the lining 84. This avoids an uncontrolled inflation, which might otherwise result, and therefore avoids undesired turning moments.

FIGS. 2 and 5 serve to illustrate that the back 36 of the float jacket of the invention is provided with a lifting strap 86 normally concealed beneath the collar 46, but exposed when the collar is erect, such that the user may be readily removed from the water in which he has been immersed. Strap 86 is connected to said back through holes in the latter which also constitute vent holes.

According to a particular feature of the invention, the strap 86 may also be covered with a luminescent or phosphorescent material which may be readily perceived, even when the ambient light level is very low.

FIGS. 8, 9, 11, 12 and 13 reveals that the front and back of the float jacket of the invention comprises inner and outer members 90 and 92 respectively. The inner member 90 may consist of any conventional lining material, whereas the outer member 92 is preferably of a suitable outer fabric such as nylon or the like.

Figure 14:
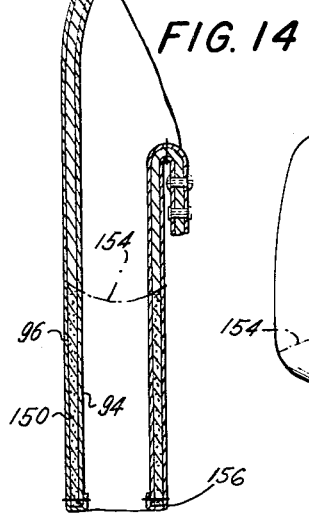
FIGURE 14 is a longitudinal section of the right arm (considered from the point of view of the wearer) of the jacket of FIG. 1.

Said inner and outer members 90 and 92 confine therebetween a chamber wherein is located an arrangement of insulating and floatation elements which are more clearly illustrated in FIG. 3, wherein is also shown the insulation and floatation material sandwiched between the inner and outer arm members 94 and 96, illustrated in the sectional view of FIG. 14.

In FIG. 3 are a plurality of vertical strips 100, 102, 104, 106, 108 and 110. These strips, in cooperation with floatation elements 112, 114, 116 and 118, define for the float jacket a horizontal or transverse turning axis 120 (see also FIGS. 1 and 2) about which the wearer of the jacket is pivoted when immersed in water.

With respect to vertical strips 100–110, these are divided into upper and lower sections, such that there is further defined a hinge axis 122 (below and parallel to axis 120) whereby that portion of the jacket which houses the lower portions of the strips is permitted to flap or pivot upwardly when the wearer is immersed in water. To this end, zipper 52 may terminate at axis 122 to facilitate this latter action.

According to a particular feature of the invention, the strips 100, 102 and 104 are of a lesser volume than are strips 106, 108 and 110. This provides that the floatation elements or strips 100, 102 and 104 provide less buoyancy for the corresponding side of the jacket than do the strips on the other side thereof.

Said strips are of a floatation and insulation material which is preferably of a fixed floatation characteristic. Such a material may, for example, be any flexible syntheic or natural material having closed or isolated cells therein, such as a foamed plastic, or rubber, or the like which does not have to be inflated.

At the back of the jacket, the aforesaid floatation element 112 is made of the same material as are the strips 100–110. A cross-section of the panel 112 is shown in FIG. 10, wherein is emphasized the wedge-shaped section or profile of this panel.

This wedge-shape is provided in accordance with a feature of the invention, whereby the floatation characteristics of the jacket are improved by moving the floatation center of the jacket upwardly to provide an improved positioning of the wearer in water as will be hereinafter shown.

The collar floatation element 114 is of the same type of floatation and insulation material as the elements 100–112, the lower panel 118, which completes the back portion of the jacket, is not. This panel, which extends throughout the lower half of the back portion and extends somewhat into the upper half thereof, while being of an insulative material, does not possess any floatation characteristics. It may be fabricated, for example, of an insulation material, such as glass wool or the like. Other substitute materials are possible, but it is preferred that this panel not be made of a floatable material, in the same sense as the elements 100–114 are floatable and that the panel be permeable to air and water.

According to a feature of the invention the providing of a non-floating panel 119 removes buoyancy from the small of the back of the wearer. As a result, the wearer is more nearly supported by suspension only rather than being supported from underneath which is a less stable type of floatation.

Figure 13:
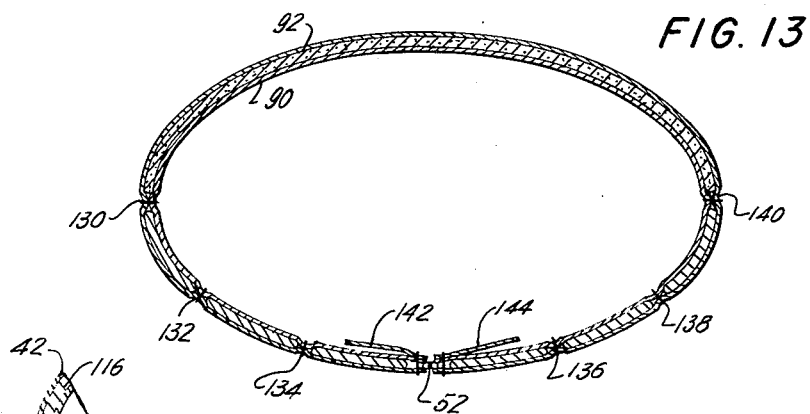
FIGURE 13 is a cross-sectional view taken along line 13—13 of FIG. 1.

Before completing an inspection of FIG. 3, attention is concomitantly directed to FIGS. 12 and 13 wherein it is seen that the strips 100–110 are maintained in position by the provision of a plurality of vertical seams 130, 132, 134, 136, 138 and 140. These seams serve the purpose of strengthening the float jacket structure, while at the same time maintaining the strips 100–110 in appropriate position.

FIGS. 12 and 13 also show the protection flaps 142 and 144, which are employed to protect the wearer of the jacket from being caught in the zipper 52.

Returning again to FIG. 3 it is seen that the internal elements of the arms of the float jacket of the invention, in addition to comprising floatation and insulation elements 116 and 118, include further elements 150 and 152 which are similar to the panel 119 discussed above. In other words, these latter elements are of an insulative material, such as fiber glass or the like, which possesses an insulation characteristic but is not considered a floatable material.

Figure 15:
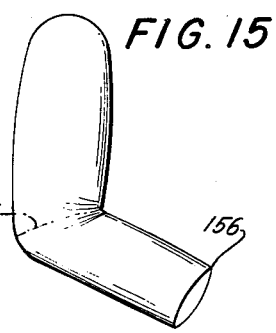
FIGURE 15 illustrates, in perspective view, the improved mobility of said arm.

In FIGS. 14 and 15, it can be seen that the arms of the jacket are each divided into two sections at an elbow zone 154, the floatation and insulation elements 116 and 118 being comprised within each arm between the shoulder zone 42 thereof and said elbow zone.

At the same time, the insulative elements 150 and 152 are comprised within each arm, between the elbow zone 154 thereof and the wrist zone 156 thereof.

It has been determined that, if the arms were to be fabricated entirely of a floatation material, movement of the wearer while in water would be significantly impeded. It has been determined further that a greatly improved degree of mobility is afforded should the floatation material below the elbows be replaced by an appropriate insulative material which does not cause the forearms of the wearer to assume a buoyancy when immersed. Accordingly, the arrangements of the elements 116, 118, 150 and 152 of the arms of the jacket constitute a feature of the invention.

As appears particularly in FIGS. 8 and 9, the interior of the float jacket of the invention comprises an inner member 160, defining within the jacket a series of pockets or chambers within which is accommodated the bladder 162. Inner member 160 can be either an integral part of member 90 or separated therefrom.

The details of the bladder, before it is assembled into the jacket, appear in FIG. 6 wherein it is seen that the bladder includes a right lobe 164, a left lobe 166, and an interconnecting portion 168.

Each of the aforesaid lobes is, in the deflated condition of the bladder, of generally flat rectangular form having respective upper extremities 169 and 170 and lower extremities 172 and 174.

The lower extremities 172 and 174 are respectively provided with outer corners 176 and 178 and inner corners 180 and 182. The upper extremities 169 and 170 are respectively provided with inner corners 176 and 178 and with outer corners 180 and 182.

The interconnecting portion 168 is connected to the outer corners 180 and 182 by connecting portions 184 and 186 respectively.

Lobes 164 and 166 have laterally facing peripheries 188 and 190 wherein are provided recesses 192 adapted for arm accommodation, as will be apparent from an inspection of FIG. 7.

In assembling the bladder into the jacket in accordance with the invention, the connecting portions 184 and 186 are given a half-twist into helical form so that the lobes 164 and 166 then have peripheral edges 189 and 191 in facing relation as appears in FIG. 7. This causes the interconnecting portion 168 in pocket 193 in collar 46 to lie flatly against the back of the jacket in hinged manner.

This also provides, however, that when the bladder is inflated, the interconnecting portion 168 will come to stand erect as shown in solid lines and therefore, in cooperation with the collar, cause the head of the wearer to be held erect.

Referring again to FIGS. 1 and 2, it will be seen that the jacket of the invention has a vertical axis of symmetry 200, with respect to which the floatation elements 100–110 of FIG. 3 provide an imbalance as aforesaid. According to a further feature of the invention, the lobes 164 and 166 are provided to be of unequal volume so as to provide a floatation imbalance which is opposite to that caused by the strips 100–110. Preferably, the lobe 164 is made of greater volume than the lobe 166, inasmuch as the latter has the additional bulk of inflation tube 60 and a compressed pneumatic-medium source 202 as seen in FIG. 7 and as discussed in greater detail hereinunder Reference is next made to FIGS. 16 and 17, to illustrate how the various imbalances of the invention are usefully employed.

Figure 16:
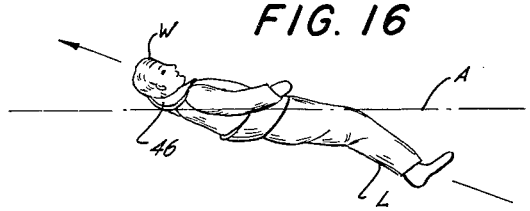
FIGURE 16 illustrates how the wearer of the float jacket will be positioned when immersed in water.

In FIG. 16 the wearer W is shown in substantially horizontal position with his head supported in erect position by the collar 46 and with his legs L being fully immersed in the water A. The reason the wearer assumes this advantageous position is that, due to the provision of buoyant strips 100–110 compared with non-buoyant panel 119 (FIG. 3) and further due to the provision of lobes 164 and 166 at the front of the wearer, 70–90% of the buoyancy of the structure is positioned at the front of the jacket. This causes wearer W to pivot to head-up position around turning axis 120 (see FIG. 1, etc.).

Figure 17:
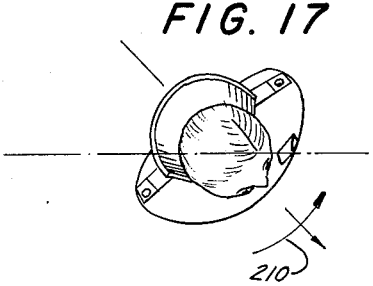
FIGURE 17 illustrates a turning moment provided in accordance with the invention relative to the longitudinal axis of the jacket.

In addition, the imbalance of the fixed floatation material (i.e., that material having the closed cells and being of a fixed floatation index) causes the pivoting moment illustrated by the arrow 210 in FIG. 17.

It will be noted with respect to said moment that it is initially caused by virtue of the fixed floatation material which becomes effective immediately upon immersion of the wearer in water. The imbalance of the bladder is employed subsequently when the wearer has had opportunity to inflate the same, the imbalance of the bladder being such as to cancel out and perhaps override that of the fixed floatation material.

It is to be additionally noted that in accordance with the invention the lobes 164 and 166 are in free communication with each other via the interconnecting portion 168 and the connecting portions 184 and 186. This permits an automatic balancing of the floatation characteristics of the wearer after he has been placed into a body of water, the imbalance of the lobes facilitating the compensation of the imbalance of the fixed floatation elements.

Figure 18:
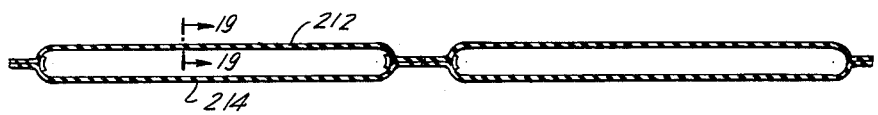
FIGURE 18 is a cross-sectional view of the bladder taken along line 18—18 of FIG. 6.
Figure 19:
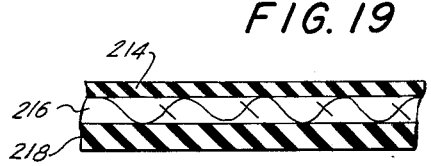
FIGURE 19 is an enlarged fragmentary cross-sectional view taken along line 19—19 of FIG. 18.
Figure 20:
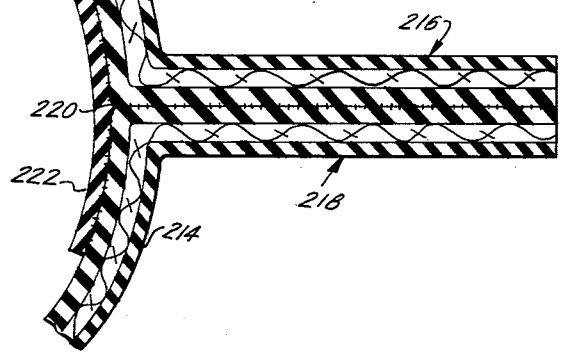
FIGURE 20 is an enlarged cross-sectional detail of a constructional feature illustrated in FIG. 18.

FIGS. 18–20 illustrate two further features of the invention.

In FIG. 19 it is seen that each of the opposing walls 212 and 214 (FIG. 18) of the bladder is composed of a lamination of layers 214, 216 and 218.

Layers 214 and 218 may be made of synthetic or natural rubber and may, for example, be made of neoprene. The layer 214 is the outermost layer and is thinner than the interior or innermost layer 218. Both these layers sandwich the intermediate layer 216 which is of a woven or fabric-like material such as nylon or the like impregnated with rubber.

The outer layer 214 may, for example, have a weight of 75 gms. per sq. meter, in contrast to the heavier weight of the inside coating, which may range, for example, from 175–200 gms. per sq. meter. The inner core or layer 216 may have a weight, for example, of from 90–120 gms. per sq. meter.

In FIG. 20, it is illustrated that the walls 212 and 214 are provided with peripheral zones 216 and 218 which are heat-sealed to each other, so as to form a seam 220. To prevent leakage through this seam, in accordance with still a further feature of the invention, there is heat-sealed along the seam a strip 222, which is preferably formed of a rubber-coated cotton strip.

It has been found that a structure of the above-noted type, including the rubber-coated strip, can resist all of the strains to which the bladder of the invention will be put when incorporated into a float jacket of the nature described.

FIG. 21 shows the inflation tube 60 with the mouthpiece 62, the details of the latter being shown in a sectional view taken along line 24—24 of FIG. 21 in FIG. 24.

In FIG. 24 it is seen that the mouthpiece is provided with a plastic cylinder 224 inserted in the tube 60 and within which is fixedly positioned a plastic blocking disc 226 through which slidably extends the shaft 228. Said shaft has therein a bore 230, connected with a diametral hole 240 which is selectively positioned to one side or the other of the disc 226 whereby communication may be effected between the interior of the bladder and the ambient atmosphere, as desired. A fixed rotational attitude between cylinder 224 and shift 228 is maintained by keys 232 and grooves 234 provided in head 236 on said shaft.

Normally, the spring 242 operates to hold the shaft 228 in such a position that the hole 240 is on the outer side of the disc 226 whereupon the interior of the bladder is isolated from ambient atmosphere.

Also provided in accordance with the invention, and illustrated in FIG. 21, is the compressed pneumatic-medium source 202 operated through a release mechanism 244 by means of a lanyard 246 (extending through the pocket 58, as illustrated in FIG. 1).

In accordance with the invention there are provided two cartridges within the source 202. The details of this particular source are illustrated in another co-pending application but it is notable that, according to the invention, two different sources of inflation media are provided for improved safety.

The above-noted harness 70 is illustrated in detail in FIG. 22 wherein are shown the leg loops 72 and 74 and the straps 78, 80 and 82, heretofore described with reference to FIG. 4.

In FIG. 11 as well as FIG. 22, it is seen that the lifting strap 86 may be directly riveted or attached by grommets and rivets 247 and 248 to the straps 80 and 82 and thence to the harness. In accordance with a further feature of the invention, this provides a strengthened structure whereby lifting forces applied to strap 86 are transferred to the wearer W by means of the harness and not by means of the jacket.

The harness 70 may also comprise safety buckle 250 and various adjusting devices such as those illustrated at 252 and 254 whereby adjustment to different sizes is possible.

FIG. 23 illustrates a lifting strap or tab 256 provided on the shoulder portion of the body of the jacket of the invention.

Illustrated on the breast portion is the loop 64 into which may be inserted the whistle 66 attached to the loop by a line or lanyard 260. In accordance with a further feature of the invention, there is provided a lamp 262 of battery-operated type, to which is affixed an alligator clip 264, detachably affixing the same to the aforesaid loop. The jacket is thus provided with readily maneuvered audio and visual aids.

From the above description, it will now be understood that there is provided, in accordance with the invention, a float jacket comprising a body portion having a normal vertical disposition, in which it has a front and a back, the body portion including inner and outer members connected together to form a front chamber in at least two sections, and a back chamber, there being provided floatation elements in the chambers and cooperatively associated with each other in the front chambers to define a hinge axis in the lower half of the front of the body portion, thus to permit a flapping action of that part of the front body portion below the hinge axis with the jacket immersed in water.

It will also be now understood that there has been disclosed a float jacket comprising a body portion defining a vertical axis of symmetry relative to which there are disposed buoyant materials of fixed floatation characteristics asymmetrically distributed in the body portion relative to this axis such that one side of the body portion has a greater buoyancy due to this buoyant material than the other side.

Still further, it will be understood that there has been disclosed a float jacket comprising an inflatable bladder in the body portion which is asymmetrically dimensioned relative to the vertical axis of symmetry to effect a greater buoyancy on one side of the jacket than on the other, the buoyancy difference of the inflatable bladder being at least equal to that of the buoyant materials so as to counteract the latter when desired.

There will now be obvious to those skilled in the art many modifications and variations of the structure set forth above, these modifications and variations will not depart from the scope of the invention if defined by the following claims.

I claim:

1. A float jacket comprising a body portion having a normal vertical disposition in which said portion has a front and a back, said body portion including inner and outer members connected together to form two front chambers and a back chamber, said jacket further comprising floatation elements in said front and back chambers, said elements being cooperatively associated with each other in the front chambers to define a hinge axis in the lower half of the front of the body portion whereby to permit a flapping action of that part of the front of the body portion below the hinge axis with the jacket immersed in water, the elements being cooperatively associated in the back chamber to limit the said flapping action to the front of the body portion.

2. A jacket as claimed in claim 1 wherein the floatation elements define a horizontal floatation turning axis in the lower half of said body portion and wherein said hinge axis is below and parallel to said turning axis.

3. A jacket as claimed in claim 2 wherein the floatation elements in the front chamber are parallel vertical strips.

4. A jacket as claimed in claim 3 wherein the strips are divided along said hinge axis.

5. A float jacket comprising a body portion having a normal vertical disposition in which said portion has a front and a back, said body portion including inner and outer members connected together to form two front chambers and a back chamber, said jacket further comprising floatation elements in said front and back chambers, said elements being cooperatively associated with each other in the front chambers to define a hinge axis in the lower half of the front of the body portion whereby to permit a flapping action of the part of the front of the body portion below the hinge axis with the jacket immersed in water, said floatation elements defining a horizontal floatation turning axis in the lower half of said body portion and wherein said hinge axis is below and parallel to said turning axis, said jacket further comprising arms having elbow zones, said arms being connected to the sides of the upper half of said body portion at shoulder zones in the latter, said arms including inner and outer members defining chambers therebetween, and a floatation and insulation material in the latter said chambers approximately between the shoulder and elbow zones exclusively.

6. A jacket as claimed in claim 5 comprising an insulative material in the chambers of the arms below said elbow zones.

7. A jacket as claimed in claim 6 wherein the floatation and insulation material is a flexible cellular material having a multitude of isolated cells therein and the insulative material is a flexible material permeable to air and water.

8. A float jacket comprising a body portion having a normal vertical disposition in which said portion has a front and a back, said body portion including inner and outer members connected together to form two front chambers and a back chamber, said jacket further comprising floatation elements in said front and back chambers, said elements being cooperatively associated with each other in the front chambers to define a hinge axis in the lower half of the front of the body portion whereby to permit a flapping action of that part of the front of the body portion below the hinge axis with the jacket immersed in water, said floatation elements defining a horizontal floatation turning axis in the lower half of said body portion and wherein said hinge axis is below and parellel to said turning axis, the floatation elements in the front chamber being parallel strips; and a wedge-sectioned panel of floatation and insulation material in the uppermost part of the back chamber, said panel tapering downwardly and terminating above said turning axis.

9. A jacket as claimed in claim 8 comprising an insulative material filling the back chamber below said panel.

10. A jacket as claimed in claim 9 wherein the floatation and insulation material is a flexible cellular material having a multitude of isolated cells therein and the insulative material is a flexible material permeable to air and water.

11. A jacket as claimed in claim 5 comprising a collar connected atop the back of said body portion and having a chamber provided therein, and a floatation and insulation material in the collar chamber.

12 A jacket as claimed in claim 11 wherein the collar chamber communicates with both said front chambers, comprising an inflatable bladder including two front lobes positioned in respective of the front chambers and an inflatable connecting portion opening into each of said lobes and extending through the collar chamber.

13. A jacket as claimed in claim 12 wherein said bladder is normally deflated such that the lobes lie flatly against the floatation elements in the front chambers and the connecting portion lies flatly against the floatation and insulation material in the collar chamber.

14. A jacket as claimed in claim 13 wherein the connecting portion includes helically twisted extremities connected to said lobes.

15. A jacket as claimed in claim 13, wherein the body portion includes a breast pocket on the front and having an interior opening coupled to one of the front chambers, comprising an inflation tube coupled to the lobe in said one front chamber, said tube extending through said interior opening and protruding outwardly of said pocket.

16. A jacket as claimed in claim 15 comprising a compressed pressure medium cartridge mounted on and coupled to the latter said lobe, a release mechanism on the cartridge to release said medium into the bladder and a flexible actuating member connected to the release mechanism and extending through said interior opening and protruding from said pocket.

17. A jacket as claimed in claim 16 comprising a lamp and means to detachably connect the lamp to the front of the body portion.

18. A jacket as claimed in claim 17 wherein said means includes a loop on said front and a clip on the lamp and engaged with said loop.

19. A jacket as claimed in claim 18 comprising a whistle slideably engageable within said loop and a lanyard connecting said whistle to said loop.

20. A jacket as claimed in claim 15 comprising a perforated inner lining connected to the inner member of the body portion across the top of the back of the latter.

21. A jacket as claimed in claim 15 comprising a lifting strap connected to the body portion and positioned externally of the same towards the top of the back thereof.

22. A jacket as claimed in claim 21 wherein the strap comprises a light emitting substance.

23. A jacket as claimed in claim 15 comprising an adjustable leg-notch harness fastened to the body portion within the latter.

24. A jacket as claimed in claim 12 wherein said bladder comprises a lamination of layers including a layer of fabric-like material and layers of rubber-like material sandwiching the same.

25. A jacket as claimed in claim 24 comprising a rubber-like material impregnating the fabric-like material.

26. A jacket as claimed in claim 25 wherein the bladder comprises front and rear walls each consisting of one said lamination, the laminations of the walls being peripherally bonded and thereby forming a seam therebetween, the bladder including a sealing strip attached along the seam.

27. A jacket as claimed in claim 24 wherein the outermost of said layers is thinner than the innermost of said layers.

28. A jacket as claimed in claim 12 wherein one of the lobes is of greater capacity than the other.

29. A jacket as claimed in claim 12 wherein the floatabilities of the floatation elements in the front chambers are different from one another.

30. A jacket as claimed in claim 12 comprising cooperating zipper elements on and peripherally bordering said front chambers.

31. A jacket as claimed in claim 30 wherein the zipper elements terminate downwardly at said hinge axis.

32. A jacket as claimed in claim 31 comprising seams connecting the inner and outer members of the body portion between said vertical strips.

33. A jacket as claimed in claim 21 comprising a zipper element connected to said body portion proximate said strap and adapted for the attachment of a hood.

34. A jacket as claimed in claim 21 comprising lifting straps on the body portion proximate said shoulder zones.

35. A jacket as claimed in claim 21 wherein said body portion is provided with vent holes.

36. A jacket as claimed in claim 35 wherein said strap extends through at least some of said vent holes and is connected to the body portion internally of the same.

37. A float jacket comprising a body portion defining a vertical axis of symmetry, and a buoyant material of fixed flotation characteristics asymmetrically distributed in said body portion relative to said axis such that one side of the body portion has a greater buoyancy due to said buoyant material than the other side; said jacket further comprising an inflatable bladder in said body portion, said bladder being asymmetrically dimensioned relative to said axis to effect a greater buoyancy on said other side than on said one side when inflated, the latter said buoyancy being at least equal to the first said buoyancy.

38. A float jacket as claimed in claim 37 wherein said body portion includes a front and back and wherein, in the back, said buoyant material is confined within the upper half of the body portion.

39. A float jacket as claimed in claim 37 comprising bladder inflation means mounted on said bladder on said one side.

40. A float jacket as claimed in claim 37 wherein said buoyant material has therein a multitude of closed cells.

41. A float jacket comprising a body portion having a rear part and two front parts connected to opposite sides of the rear part, a collar hingedly connected to at least said rear part and adapted for lying flatly thereagainst, said collar and front parts being provided with interior chambers and having openings connecting said chambers; and a bladder including lobes in respective of the chambers in said front parts, an inflatable inter-connecting bladder portion in the chamber in said collar, and inflatable flexible helical portions connecting said lobes to said interconnecting portion proximate said openings whereby, upon the bladder's being inflated, the helical portion tends to unwind and cause the interconnecting portion and thereby the collar to stand erect and support the head of the user said lobes having inwardly facing and opposed edges which in the totally unwound condition of the helical portion face outwardly.

42. A float jacket as claimed in claim 41 wherein the lobes and interconnecting and helical portions are in free communication whereby to compensate for movement when immersed in water.

43. A float jacket comprising a floatable body portion having shoulder zones therein, arms connected to the body portion at the shoulder zones, said arms having elbow and wrist zones, a floatation and insulation material in the arms from the shoulder to elbow zones, and an insulative material permeable to air and water in said arms between the elbow and wrist zones.

44. A float jacket as claimed in claim 43, wherein the body portion comprises a front and back, said jacket further including a floatation and insulation material in the front and in the upper portion of the back, and an insulative material permeable to air and water in the bottom portion of the back.

45. A float jacket comprising inner and outer members, a cellular buoyant material between said members, and an inflatable member associated with said material and supplementing the buoyancy of the same, said inner and outer members constitute a body portion having two connectible front portions and said inflatable member includes two interconnected lobes respectively positioned in said front portions, said jacket further comprising inflation means connected to one of said lobes for the inflation of both said lobes.

46. A jacket as claimed in claim 45 comprising a collar on said body portion and a cellular buoyant member in the collar.

References Cited by the Examiner

UNITED STATES PATENTS

| | | | |
|---|---|---|---|
| 281,824 | 7/83 | Bauer | 9—342 |
| 1,366,344 | 1/21 | Bailey | 9—333 |
| 2,226,564 | 12/40 | Kienitz | 9—342 |
| 2,363,639 | 11/44 | Brown | 9—342 |
| 2,502,301 | 3/50 | Alderfer | 137—223 |
| 2,508,303 | 5/50 | Sturtevant | 9—316 |
| 2,607,934 | 8/52 | Bailhe | 9—341 |
| 2,621,342 | 12/52 | Boyle | 9—316 X |
| 2,629,117 | 2/53 | Frieder et al. | 9—342 |
| 2,699,194 | 1/55 | Iknayan | 152—350 |
| 2,712,338 | 7/55 | Hurt | 152—350 |
| 2,905,954 | 9/59 | Lanciano | 9—442 |
| 2,950,488 | 8/60 | Sabo | 9—316 |

FERGUS S. MIDDLETON, *Primary Examiner.*